(12) United States Patent
Furukawa et al.

(10) Patent No.: US 11,444,565 B2
(45) Date of Patent: Sep. 13, 2022

(54) POWER DEVICE AND MOTOR CONTROL APPARATUS PROVIDED WITH SAID POWER DEVICE

(71) Applicant: Panasonic Intellectual Property Management Co., Ltd., Osaka (JP)

(72) Inventors: Satoshi Furukawa, Osaka (JP); Yusuke Shimogaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/272,495

(22) PCT Filed: Jul. 11, 2019

(86) PCT No.: PCT/JP2019/027434
§ 371 (c)(1),
(2) Date: Mar. 1, 2021

(87) PCT Pub. No.: WO2020/054202
PCT Pub. Date: Mar. 19, 2020

(65) Prior Publication Data
US 2021/0320608 A1 Oct. 14, 2021

(30) Foreign Application Priority Data

Sep. 13, 2018 (JP) .............................. JP2018-171029

(51) Int. Cl.
*H02P 27/08* (2006.01)
*H02P 29/024* (2016.01)

(52) U.S. Cl.
CPC ............ *H02P 29/026* (2013.01); *H02P 27/08* (2013.01); *H02P 2201/09* (2013.01)

(58) Field of Classification Search
CPC .... H02P 29/026; H02P 27/08; H02P 2201/09; H02M 1/36
See application file for complete search history.

(56) References Cited

U.S. PATENT DOCUMENTS

| 7,015,596 B2 * | 3/2006 | Pail | G08B 13/1454 307/20 |
| 8,498,767 B2 * | 7/2013 | Kotani | H02J 7/1438 701/22 |

(Continued)

FOREIGN PATENT DOCUMENTS

| JP | 8-182400 | 7/1996 |
| JP | 8-322253 | 12/1996 |

(Continued)

OTHER PUBLICATIONS

The Extended European Search Report dated Sep. 23, 2021, issued in counterpart EP Application No. 19859792 4. (8 pages).

(Continued)

*Primary Examiner* — Rina I Duda
(74) *Attorney, Agent, or Firm* — WHDA, LLP

(57) ABSTRACT

A power device includes: a DC voltage output circuit that generates a DC internal power voltage from external supply power; a capacitor that is connected to the internal power voltage; and a voltage supply control circuit that monitors a voltage level of the internal power voltage and that, when detecting a drop in the internal power voltage, cuts off supply of the internal power voltage. The power device supplies internal power to a load. The power device supplies, to a first load that is a part of the load, the internal power voltage, and supplies, to a second load that is a load other than the first load, the internal power voltage via the voltage supply control circuit.

7 Claims, 9 Drawing Sheets

(56) References Cited

U.S. PATENT DOCUMENTS

| | | | |
|---|---|---|---|
| 2009/0027932 A1* | 1/2009 | Haines | H02J 3/46 363/95 |
| 2017/0106899 A1 | 4/2017 | Xu et al. | |
| 2017/0141570 A1* | 5/2017 | Vijayan | H02M 3/33546 |

FOREIGN PATENT DOCUMENTS

| | | |
|---|---|---|
| JP | 10-004674 | 1/1998 |
| JP | 2017-215068 | 12/2017 |

OTHER PUBLICATIONS

International Search Report of PCT application No. PCT/JP2019/027434 dated Sep. 24, 2019.

* cited by examiner

POWER DEVICE AND MOTOR CONTROL APPARATUS PROVIDED WITH SAID POWER DEVICE

TECHNICAL FIELD

The present invention relates to a power device that includes a capacitor for holding a voltage and has a function of extending a voltage holding time when power is cut off, and to a motor control apparatus including the power device.

BACKGROUND ART

A power device is used for converting a voltage supplied from input source power into an appropriate voltage and supplying the converted voltage to a device such as a central processing unit (CPU) or an integrated circuit (IC). It is desirable to these devices that a supply voltage of the power device is always stable regardless of changes in environmental conditions. That is, it is desirable to the power device that, for example, in a case of a momentary interruption in which the input source power is momentarily stopped or the voltage drops, an influence thereof does not appear on an output side. Additionally, in an information processing device equipped with a CPU, etc., operation of data equipment is protected by utilizing a period (hereinafter, referred to as an output holding time) when after the input source power is cut of, an output voltage is held within a standard range for input fluctuations of the device. Therefore, the power device is required to have an output holding time longer than or equal to a certain period.

Conventionally, it is generally known to increase a capacitance of an input-side capacitor in order to extend the output holding time (see, e.g., PTL 1). FIG. 8 is a block diagram showing a power device of a conventional example. In FIG. 8, power device 911 includes rectifier circuit 913 that rectifies an AC input, input-side capacitor 914, switching power unit 915, and output-side capacitor 916. Additional capacitor 917 of unit panel 912 is connected to device-side connection terminal T5 provided in parallel with input-side capacitor 914 by a plug-in method via unit-side connection terminal T6. That is, additional capacitor 917 is selectively added, if necessary, from an outside to capacitor 914 between an output side of rectifier circuit 913 and an input side of switching power unit 915, so that the output holding time can be extended even when the AC input is cut off.

In PTL 2, the output holding time is extended by adopting a following configuration. FIG. 9 is a block diagram showing another power device of the conventional example. In FIG. 9, power device 920 includes diode rectifier 921 that rectifies an AC input, smoothing capacitors C91, C92, series/parallel switching circuit 925 including switches Sw1, Sw2, Sw3 for switching connection, switching controller 927, and voltage converter 924. Capacitors C91, C92 and series/parallel switching circuit 925 form capacitor section 922. Series/parallel switching circuit 925 switches capacitors C91, C92 to either series connection or parallel connection by control from switching controller 927. Voltage converter 924 converts a voltage supplied from capacitor section 922 into a desired output voltage and outputs it. In such a configuration, power device 920 connects capacitors C91, C92 in parallel when the AC input is in a normal state. When a momentary interruption occurs in the AC input, switching controller 927 switches Sw1, Sw2, Sw3 of series/parallel switching circuit 925 such that capacitors C91, C92 are connected in series.

That is, capacitors C91, C92 are connected in parallel in a normal state, but when the AC input is momentarily interrupted, voltages of capacitors C91, C92 drop with predetermined time constants. When the voltages drop to a predetermined voltage, capacitors C91, C92 are switched to a series connection. In PTL 2, a power supply time to a load is extended by increasing an input voltage to voltage converter 924, as described above.

As described above, in the conventional example, an input-side capacitor is added, or a connection between two capacitors is switched to a series connection or a parallel connection. In either case, however, it is necessary to equip a plurality of capacitors. Increasing a number of large components such as capacitors is a major problem in a power device that is required to be small in size.

CITATION LIST

Patent Literature

PTL 1: Unexamined Japanese Patent Publication No. H10-4674

PTL 2: Unexamined Japanese Patent Publication No. H8-322253

SUMMARY OF THE INVENTION

The present invention has been made to solve such a problem. It is an object of the present invention to provide a power device capable of extending an output holding time of an output voltage without adding a large component such as a capacitor, and a motor control apparatus including the power device.

In order to achieve the above object, a power device of the present invention is a power device that supplies internal power to a load, and includes a DC voltage output circuit, a capacitor, and a voltage supply control circuit. The DC voltage output circuit generates a DC internal power voltage from external supply power. The capacitor is connected to the internal power voltage. The voltage supply control circuit monitors a voltage level of the internal power voltage and, when detecting a drop in the internal power voltage, the voltage supply control circuit cuts off supply of the internal power voltage. The power device supplies, to a first load that is a part of the load, the internal power voltage, and supplies, to a second load that is a load other than the first load, the internal power voltage via the voltage supply control circuit.

With such a configuration, it can be detected, by detecting a drop in the internal power voltage, that the supply of external power from an outside to the power device is cut off. When the cut-off of the supply of external power is detected in this way, the supply of the internal power voltage to the second load is cut off. With the power device operating in this way, the internal power voltage is supplied from the capacitor only to the first load after the supply of external power is cut off. Therefore, a power supply time to the first load can be extended as compared with a case where the internal power voltage is continuously supplied to an entire load.

Also, in the power device of the present invention, the voltage supply control circuit may cut off the supply of the internal power voltage for a predetermined period, when detecting a drop in the internal power voltage.

Also, the power device of the present invention may further include a booster circuit that generates a boosted voltage by boosting the internal power voltage. When detecting a drop in the internal power voltage, the voltage supply control circuit may cut off the supply of the internal power voltage to the second load, and may supply internal power to the first load by switching from the supply of the internal power voltage to supply of the boosted voltage.

The motor control apparatus of the present invention includes the power device described above, a motor controller that controls rotation of a motor, and a motor drive unit that energizes the motor according to a command from the motor controller. The motor control apparatus drives and controls the motor. The motor control apparatus supplies the internal power voltage to the motor controller as the first load and to the motor drive unit as the second load.

With such a configuration, the power supply time, to the motor controller that is the first load, of the internal power voltage after the cut-off of the supply of external power can be extended, as described above. Further, the supply of the internal power voltage to the motor drive unit is also immediately stopped after the supply of external power is cut off, and hence a movement of the motor is stopped sooner, whereby safety can be improved. Furthermore, the motor controller finally connects the internal power voltage to the motor drive unit by utilizing the extended power supply time, and hence the capacitor is completely discharged, whereby a malfunction, etc., due to remaining power can be suppressed.

Also, the motor control apparatus of the present invention may include a microcontroller. The power device may supply the internal power voltage to the microcontroller, and the microcontroller may control the voltage supply control circuit so as to resume the supply of the internal power voltage to the load after a predetermined period has passed since the cut-off of the supply of the internal power voltage by the voltage supply control circuit.

Another power device of the present invention is a power device that supplies internal power to a load, and includes a DC voltage output circuit, a capacitor, a booster circuit, and a voltage supply control circuit. The DC voltage output circuit generates a DC internal power voltage from external supply power. The capacitor is connected to the internal power voltage. The booster circuit generates a boosted voltage by boosting the internal power voltage. The voltage supply control circuit monitors a voltage level of the internal power voltage and, when detecting a drop in the internal power voltage, the voltage supply control circuit supplies the internal power by switching from supply of the internal power voltage to supply of the boosted voltage. The power device supplies the internal power to a part of the load via the voltage supply control circuit.

With such a configuration, the boosted voltage can be used even if a voltage level of the internal power voltage drops, and hence an operable time of the part of the load can be extended.

As described above, the power device of the present invention can extend the power supply time to a part of a specified load only by a circuit configuration. Therefore, according to the power device of the present invention, a small power device capable of extending an output holding time of internal power without increasing a number and capacity of capacitors, and a motor control apparatus including this power device can be provided.

DESCRIPTION OF EMBODIMENTS

Figure 1:
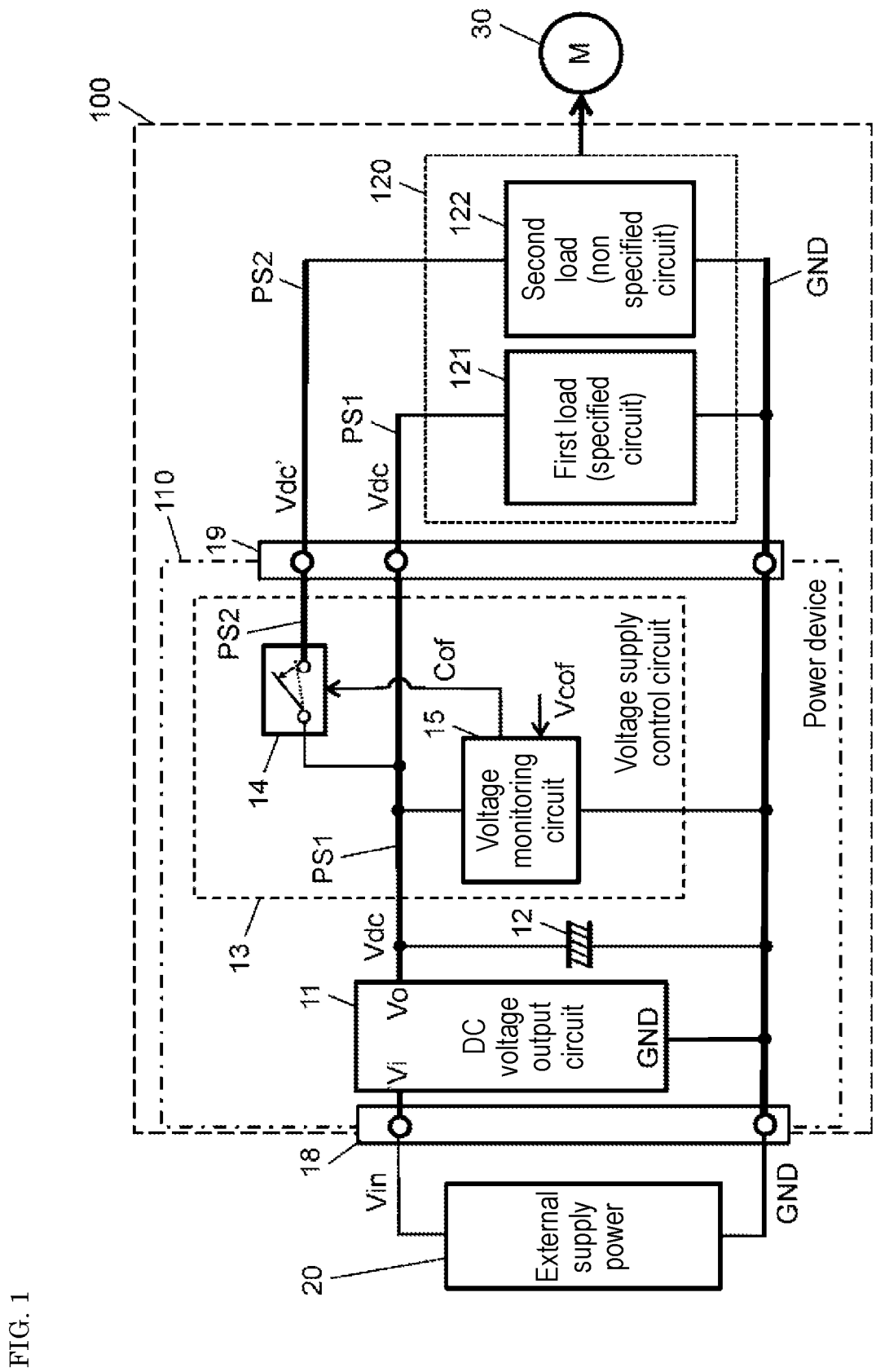
FIG. 1 is a block diagram showing electrical equipment including a power device according to a first exemplary embodiment of the present invention.

Hereinafter, exemplary embodiments of the present invention will be described with reference to the drawings. It should be noted that each of the exemplary embodiments described below shows a preferred specific example of the present invention. Therefore, the numerical values, constituent elements, arrangement positions and connection forms of the constituent elements, steps, order of steps, etc., shown in the following exemplary embodiments are examples, and they are not intended to limit the present invention. Therefore, among the constituent elements in the following exemplary embodiments, constituent elements that are not described in the independent claims indicating the highest concepts of the present disclosure are described as arbitrary constituent elements.

Each drawing is a schematic view and is not necessarily drawn exactly. In each drawing, the substantially same components are denoted by the same reference numerals, and duplicate description will be omitted or simplified.

First Exemplary Embodiment

FIG. 1 is a block diagram showing electrical equipment including power device 110 according to a first exemplary embodiment of the present invention. In the present exemplary embodiment, motor control apparatus 100 that drives and controls motor 30 will be described as an example of such electrical equipment.

As shown in FIG. 1, motor control apparatus 100 includes power device 110 and load 120 formed by an electrical circuit, etc., including electrical components. The electrical circuit forming load 120 is electrically connected to power device 110. Thereby, a predetermined voltage required to operate load 120 is supplied from power device 110 to load 120. In the present exemplary embodiment, this predetermined voltage is designated as DC voltage VC. During the operation of motor control apparatus 100, internal power voltage Vdc, which serve as DC voltage VC, is supplied to load 120 as internal power. As described above, power device 110 supplies internal power voltage Vdc to load 120. Then, the electrical circuit forming load 120 drives motor 30 while controlling rotational operation of motor 30. Hereinafter, motor control apparatus 100 will be described as an example of the present exemplary embodiment.

Power device 110 receives power, as external power, from external supply power 20 that is external power supply via power input terminal 18. External supply power 20 may be either AC power or DC power. In a case of AC power, power device 110 has a configuration including, for example, a rectifier circuit for converting to DC voltage. FIG. 1 shows an example in which DC input voltage Vin as an external supply voltage is supplied from external supply power 20 to power input terminals 18. Here, one side of power input terminal 18 is set to a ground terminal and the other side is set to an input terminal for input voltage Vin. A ground terminal side of power input terminal 18 is connected to ground line GND in motor control apparatus 100. A side of input voltage Vin of power input terminal 18 is connected to an input end of power device 110. With such connections, DC input voltage Vin is supplied from external supply power 20 to power device 110.

From power output terminal 19 of power device 110, a power output of DC voltage VC is supplied to load 120 as internal power voltage Vdc via power supply lines PS1, PS2, together with ground line GND that is a ground. The electrical circuit forming load 120 receives power from the internal power of this internal power voltage Vdc, and executes electrical operation.

In the present exemplary embodiment, load 120 is particularly divided into first load 121 that is a part of load 120 and is formed by specified circuits, and second load 122 that is another part of load 120 and is formed by circuits other than first load 121, as shown in FIG. 1. In line with that, the power output is also divided into two, like power supply lines PS1, PS2. It is configured such that first load 121 is connected to first power supply line PS1 and second load 122 is connected to second power supply line PS2. In FIG. 1, first power supply line PS1 is denoted by internal power voltage Vdc, and second power supply line PS2 is denoted by internal power voltage Vdc', the two supply lines being shown separately. Details of them will be further described below. In the present exemplary embodiment, an output holding time of internal power voltage Vdc output from power device 110 is extended by adopting such a configuration. More specifically, in the present exemplary embodiment, it is configured such that the output holding time of internal power voltage Vdc to first load 121 can be extended.

Next, the configuration of power device 110 will be described. Power device 110 includes: DC voltage output circuit 11 and capacitor 12 that generate internal power voltage Vdc of DC voltage VC; and voltage supply control circuit 13 that is aimed at extending such an output holding time.

DC voltage output circuit 11 generates internal power voltage Vdc, which is a DC voltage necessary for operating load 120, from an external supply voltage supplied as input voltage Vin, and outputs it. Here, the DC voltage necessary for operating load 120 is set to standard voltage VCnor for operating load 120 (hereinafter, appropriately referred to as a standard operating voltage). That is, for example, when the circuit component in load 120 is an IC of 5 V specification, standard operating voltage VCnor is 5 V, and internal power voltage Vdc is DC voltage VC=VCnor=5 V (volt). In motor control apparatus 100 that drives a motor, DC voltage VC is generally a higher voltage of 15 V or 24 V.

DC voltage output circuit 11 is formed by components to be used in a general power circuit such as a power IC. Input voltage Vin input to the input end is converted into output voltage Vo of DC voltage VC and is output from an output end. As a more specific example, a configuration is cited in which DC voltage output circuit 11 is formed by a three-terminal regulator, so that, for example, an input voltage of 30 V is converted into a DC voltage of 24 V and is output. DC voltage output circuit 11 may be a DC-DC converter that converts a DC voltage and outputs the converted voltage. When external supply power 20 is commercial AC power, DC voltage output circuit 11 may have a configuration in which a transformer or a rectifier circuit is further included. Output voltage Vo output from DC voltage output circuit 11 is supplied, as internal power voltage Vdc in motor control apparatus 100, to the components of each electrical circuit that forms load 120.

Capacitor 12 is connected to internal power voltage Vdc, and is provided to remove noise and ripple superimposed on output voltage Vo output from DC voltage output circuit 11, that is, on internal power voltage Vdc. Further, capacitor 12 is also provided to hold a voltage. Even after the power from external supply power 20 is cut off, capacitor 12 holds the supply of internal power voltage Vdc for a while. As described above, capacitor 12 is connected, on an output side of DC voltage output circuit 11, between ground line GND and power supply line PS1 for internal power voltage Vdc.

The present exemplary embodiment is characterized in that power device 110 further includes voltage supply control circuit 13. Voltage supply control circuit 13 includes opening and closing switch 14 formed by a switching element, etc., and voltage monitoring circuit 15 that controls opening and closing of opening and closing switch 14.

In voltage supply control circuit 13, one side of opening and closing switch 14 (hereinafter, simply referred to as switch 14 as appropriate) is connected to power supply line PS1, and the other side is connected to power supply line PS2. That is, when being in a closed state, switch 14 is turned on, so that internal power voltage Vdc from DC voltage output circuit 11 is also supplied to power supply line PS2. On the other hand, when being in an open state, switch 14 is turned off, so that the supply of supply power voltage Vdc to power supply line PS2 is cut off. In FIG. 1, in order to distinguish from internal power voltage Vdc in power supply line PS1, it is denoted by internal power voltage Vdc' in power supply line PS2. However, as a matter of course, when switch 14 is turned on, the same internal power voltage Vdc is supplied to both power supply lines PS1, PS2. The opening and closing of switch 14 is controlled by switch control signal Cof from voltage monitoring circuit 15.

In voltage supply control circuit 13, voltage monitoring circuit 15 monitors a voltage level of output voltage Vo of DC voltage output circuit 11, that is, a voltage level of internal power voltage Vdc in power supply line PS1. Voltage monitoring circuit 15 determines whether or not the voltage level of internal power voltage Vdc is normal, including determination on the cut-off of the supply of power from external supply power 20 or on a momentary interruption in which the supply of power is interrupted for a moment. More specifically, in the present exemplary embodiment, voltage monitoring circuit 15 is provided in order to determine a voltage drop like one in which the voltage level of internal power voltage Vdc drops. In order to make such a determination, determination voltage Vcof for the determination is supplied to voltage monitoring circuit 15 in FIG. 1. That is, voltage monitoring circuit 15 compares the voltage levels of internal power voltage Vdc and determination voltage Vcof with each other. With this comparison, voltage monitoring circuit 15 detects whether internal power voltage Vdc is at a voltage level lower than that of determination voltage Vcof, so that a power supply state is determined.

As a specific configuration example of voltage monitoring circuit 15, an example as follows is given, in which by using a constant voltage circuit, a voltage dividing resistance, and a comparator, a divided voltage, which is obtained by dividing internal power voltage Vdc by the voltage dividing resistance, and a voltage of the constant voltage circuit are compared with each other by the comparator. Here, the divided voltage corresponds to internal power voltage Vdc, and the voltage of the constant voltage circuit corresponds to determination voltage Vcof. Voltage monitoring circuit 15 detects whether internal power voltage Vdc is at a voltage level lower than that of determination voltage Vcof by comparing the divided voltage and the voltage of the constant voltage circuit with the comparator, so that the power supply state can be determined.

Determination voltage Vcof is set to a voltage slightly lower than standard operating voltage VCnor that is a standard voltage for operating the load. In other words, in the present exemplary embodiment, DC voltage VC is used as standard operating voltage VCnor, and hence determination voltage Vcof is set to a voltage slightly lower than DC voltage VC. When internal power voltage Vdc is at a voltage level higher than or equal to that of determination voltage Vcof, voltage monitoring circuit 15 determines that the voltage level of internal power voltage Vdc is normal and that power is being supplied from external supply power 20.

For example, when being at the voltage level of DC voltage VC necessary for operating the load, internal power voltage Vdc is at a voltage level higher than that of determination voltage Vcof. At this time, voltage monitoring circuit 15 determines that the voltage level of DC voltage VC is normal. Conversely, when detecting a voltage level drop in which the voltage level of internal power voltage Vdc drops to a voltage level lower than that of determination voltage Vcof, voltage monitoring circuit 15 determines that the supply of external power from external supply power 20 is cut off.

Based on such a determination, voltage monitoring circuit 15 controls switch 14 so as to be closed by switch control signal Cof, while internal power voltage Vdc is at a voltage level higher than or equal to that of determination voltage Vcof. Thereby, internal power voltage Vdc is also supplied to second load 122 via switch 14 and second power supply line PS2.

On the other hand, when internal power voltage Vdc is at a voltage level lower than that of determination voltage Vcof, voltage monitoring circuit 15 determines, based on the above determination, that the supply of external power is cut off or momentarily interrupted, and controls switch 14 so as to be opened by switch control signal Cof. Thereby, the supply of internal power voltage Vdc to second load 122 via second power supply line PS2 is stopped. At this time, the supply of internal power voltage Vdc to first load 121 via first power supply line PS1 is continued.

As described above, voltage supply control circuit 13 monitors the voltage of internal power voltage Vdc and, when detecting a drop in internal power voltage Vdc, voltage supply control circuit 13 cuts off the supply of internal power voltage Vdc via switch 14. Then, power device 110 supplies internal power voltage Vdc directly to first load 121 that is a part of load 120 from first power supply line PS1. On the other hand, power device 110 supplies internal power voltage Vdc to second load 122 that is the other part of load 120 via voltage supply control circuit 13 and second power supply line PS2. Therefore, when a drop in internal power voltage Vdc is detected, the supply of internal power voltage Vdc to second load 122 is cut off.

In the present exemplary embodiment, capacitor 12 is particularly disposed between internal power voltage Vdc and ground GND. Therefore, electric charges are accumulated in capacitor 12 during the operation of DC voltage output circuit 11, and after the external power is cut off, a voltage due to the electric charges accumulated in capacitor 12 is supplied to load 120 as internal power voltage Vdc. In other words, capacitor 12 is sufficiently charged during the operation of power device 110, and after the external power is cut off, internal power voltage Vdc due to discharge of capacitor 12 is supplied to load 120. Therefore, power device 110 continues supplying internal power voltage Vdc for a while even after the external power is cut off.

As described above, when it is determined that the supply of external power is cut off, power device 110 continues, for a while, supplying internal power voltage Vdc via first power supply line PS1, and stops supplying internal power voltage Vdc via second power supply line PS2. Regarding internal power voltage Vdc' of second power supply line PS2, internal power voltage Vdc' is a voltage equal to internal power voltage Vdc during while the supply of external power is not being cut off. When it is determined that the supply of external power is cut off, the supply of power is stopped.

In the present exemplary embodiment, the supply of power to second load 122 is immediately stopped after the external power is cut off, by providing voltage supply control circuit 13, as described above. That is, in the present exemplary embodiment, it is configured such that after the external power is cut off, consumption, by second load 122, of power accumulated in capacitor 12 is stopped and the power is consumed only by first load 121. With such a configuration, the supply time of internal power voltage Vdc to first load 121 is extended.

Also, in the present exemplary embodiment, load 120 is divided and connected as follows, in order to effectively adapt load 120 to power device 110. That is, first power supply line PS1 can continue, for a while, supplying internal power voltage Vdc, and hence first load 121 is selected as a circuit that needs to operate for a while even after the supply of power is cut off. Conversely, the supply of internal power voltage Vdc to second power supply line PS2 is immediately stopped after the external power is cut off, and hence second load 122 is made a circuit that does not need to operate after the supply of power is cut off.

In the present exemplary embodiment, circuits that need to continue their operations for a short period even after the supply of power is cut off are only specified, and the specified circuits form first load 121, as described above. Other circuits are designated as second load 122 formed by non-specified circuits. Specific examples of the specified circuits to serve as first load 121 include a microcontroller (hereinafter, referred to as a microcomputer) and its peripheral circuits. With this configuration, processing against momentary interruption can be executed by the microcomputer when a momentary interruption occurs. Regarding power supply lines PS1, PS2, power supply line PS1 is used for the specified circuits, whereas power supply line PS2 is used for circuits other than the specified circuits.

Further, in the present exemplary embodiment, the voltage level of determination voltage Vcof is set as follows, in order to effectively supply internal power voltage Vdc to first load 121 after the external power is cut off. That is, determination voltage Vcof is set to be in a voltage level that is lower than that of standard operating voltage VCnor and is higher than that of a minimum voltage VCmin of a power voltage at which operation is guaranteed (hereinafter, appropriately referred to as a minimum operating voltage). For example, when a circuit component of load 120 is one that is of well-known power voltage 5 V specification and the operation guarantee power voltage of which is 4.75 V to 5.25 V, determination voltage Vcof is set to be within a range of 4.75 V to 5.0 V that is a range of minimum operating voltage VCmin or higher to standard operating voltage VCnor or lower. As another example, when standard operating voltage VCnor is 24 V and minimum operating voltage VCmin at which a circuit to operate with the power can operate is 20 V, determination voltage Vcof is set to be within a range of 20 V to 24 V.

In the present exemplary embodiment, first load 121 can operate for a while even after the external power is cut off, by setting the determination voltage in this way. That is, determination voltage Vcof is set to be at a voltage level higher than that of the minimum operating voltage. Therefore, even when internal power voltage Vdc is supplied only to first load 121 by the operation of voltage supply control circuit 13, internal power voltage Vdc is at a voltage level higher than that of the minimum operating voltage. Therefore, first load 121 can continue its operation for a while.

Preferred examples of first load 121 utilizing such an action include a control circuit including the microcomputer or a CPU, as described above. Thereby, the operation of equipment, etc., can be protected after the power is cut off, by utilizing a period when internal power voltage Vdc is held within an operating voltage range.

Next, operation of motor control apparatus 100 including power device 110 configured as described above will be described focusing on operation when the external power is cut off.

Figure 2:
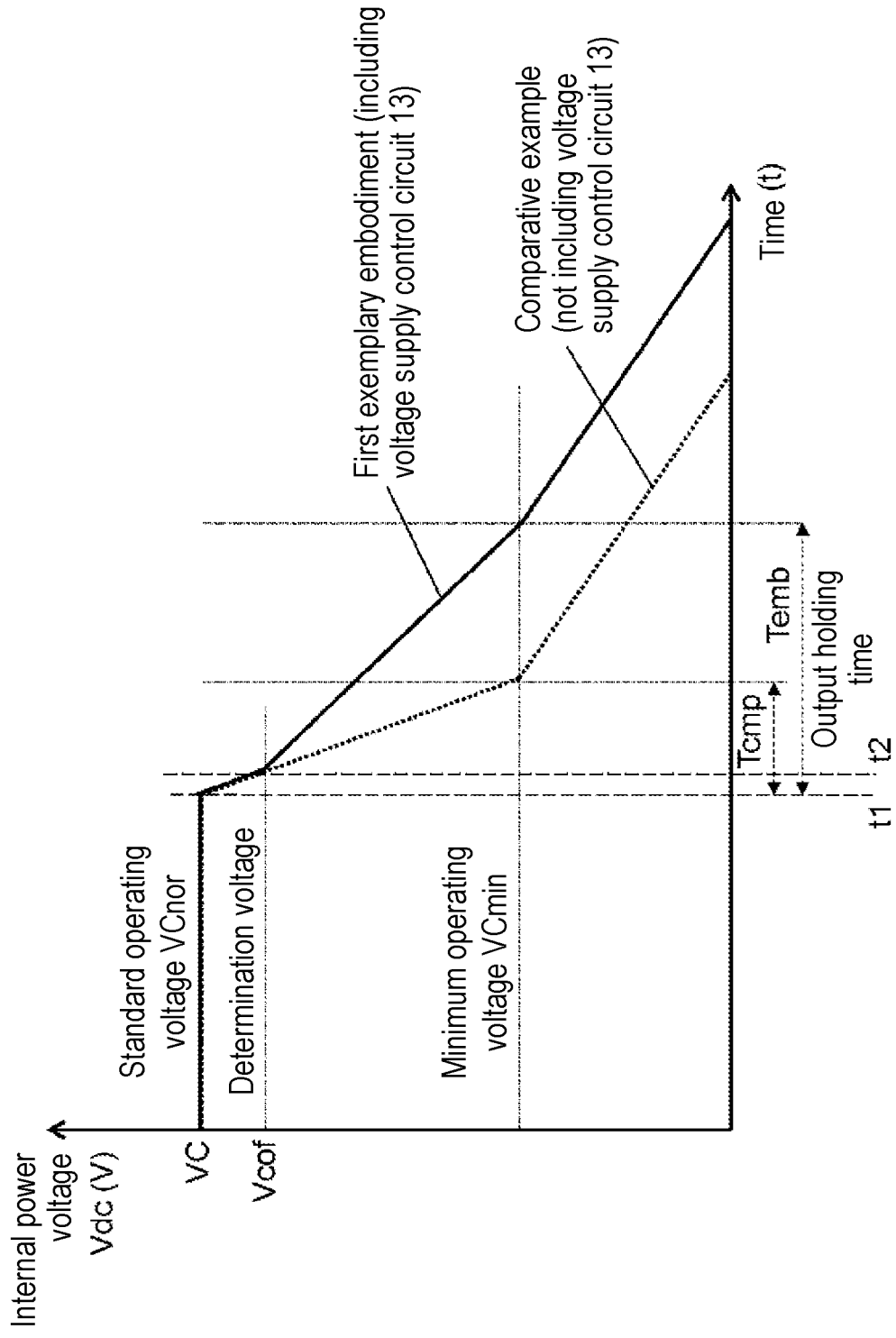
FIG. 2 is a graph showing voltage levels of an internal power voltage before and after cut-off of supply of external power in the electrical equipment.

FIG. 2 is a graph showing, in electrical equipment including the power device according to the first exemplary embodiment of the present invention, voltage levels of internal power voltage Vdc before and after cut-off of the supply of external power. In FIG. 2, a change in the voltage level in the present exemplary embodiment is shown by a solid line, and as a comparative example, a change in a voltage level occurring when voltage supply control circuit 13 is not provided is shown by a dotted line. In FIG. 2, a time when the supply of external power is cut off is designated as time t1. Further, the voltage level of determination voltage Vcof is set to be within the range of minimum operating voltage VCmin or higher to standard operating voltage VCnor or lower, as described above.

First, while the supply of external power is being continued, internal power voltage Vdc, which is DC voltage VC, is supplied to load 120, as shown in FIG. 2. Thereafter, when the external power connected to power input terminal 18 is cut off at time t1, a voltage across both ends of capacitor 12 drops as it is discharged by load 120 connected. Then, voltage monitoring circuit 15 detects, at time t2, the cut-off of the external power when the voltage across both ends becomes determination voltage Vcof, and sends switch control signal Cof. When switch 14 of voltage supply control circuit 13 is operated to be opened by switch control signal Cof, the supply of internal power voltage Vdc to second load 122 via second power supply line PS2 is cut off. That is, after the power is cut off, second load 122 is disconnected from power device 110, so that the voltage across both ends of capacitor 12 is supplied only to first load 121. Therefore, power is consumed only by first load 121 after time t2, and a rate at which the voltage level of internal power voltage Vdc drops is decreased, as shown in FIG. 2.

On the other hand, in a case of the comparative example, voltage supply control circuit 13 is not provided, and hence after time t1 when the supply of external power is cut off, the voltage level of internal power voltage Vdc drops until it becomes minimum operating voltage VCmin.

Based on a difference described above, an output holding time, which is a period when the load can operate after the cut-off of the power, becomes output holding time Tcmp in the comparative example, as shown in FIG. 2. In the present exemplary embodiment, output holding time Temb, which is longer than output holding time Tcmp, can be obtained. As described above, in the present exemplary embodiment, a period, when internal power voltage Vdc reaches minimum operating voltage VCmin that is a threshold for operating the load, becomes longer because the rate at which the voltage level drops is decreased, as compared with the comparative example. That is, the output holding time can be extended.

As described above, power device 110 according to the present exemplary embodiment includes: DC voltage output circuit 11 that generates internal power voltage Vdc from external supply power 20; capacitor 12 that is connected to internal power voltage Vdc; and voltage supply control circuit 13 that monitors internal power voltage Vdc and, when detecting a drop in internal power voltage Vdc, that cuts off supply of internal power voltage Vdc. Power device 110 supplies internal power voltage Vdc to first load 121 that needs to operate for a while after the supply of power is cut off, and supplies, via voltage supply control circuit 13, internal power voltage Vdc to second load 122 that does not need to operate after the supply of power is cut off. With such a configuration, the power supply time of power to first load 121, which needs to operate for a while even after the supply of power is cut off, can be extended without increasing a number and capacity of capacitors. Further, operation of the motor control apparatus, etc., can be protected, for example, when the apparatus is momentarily interrupted, by utilizing the extended power supply time.

Second Exemplary Embodiment

Figure 3:
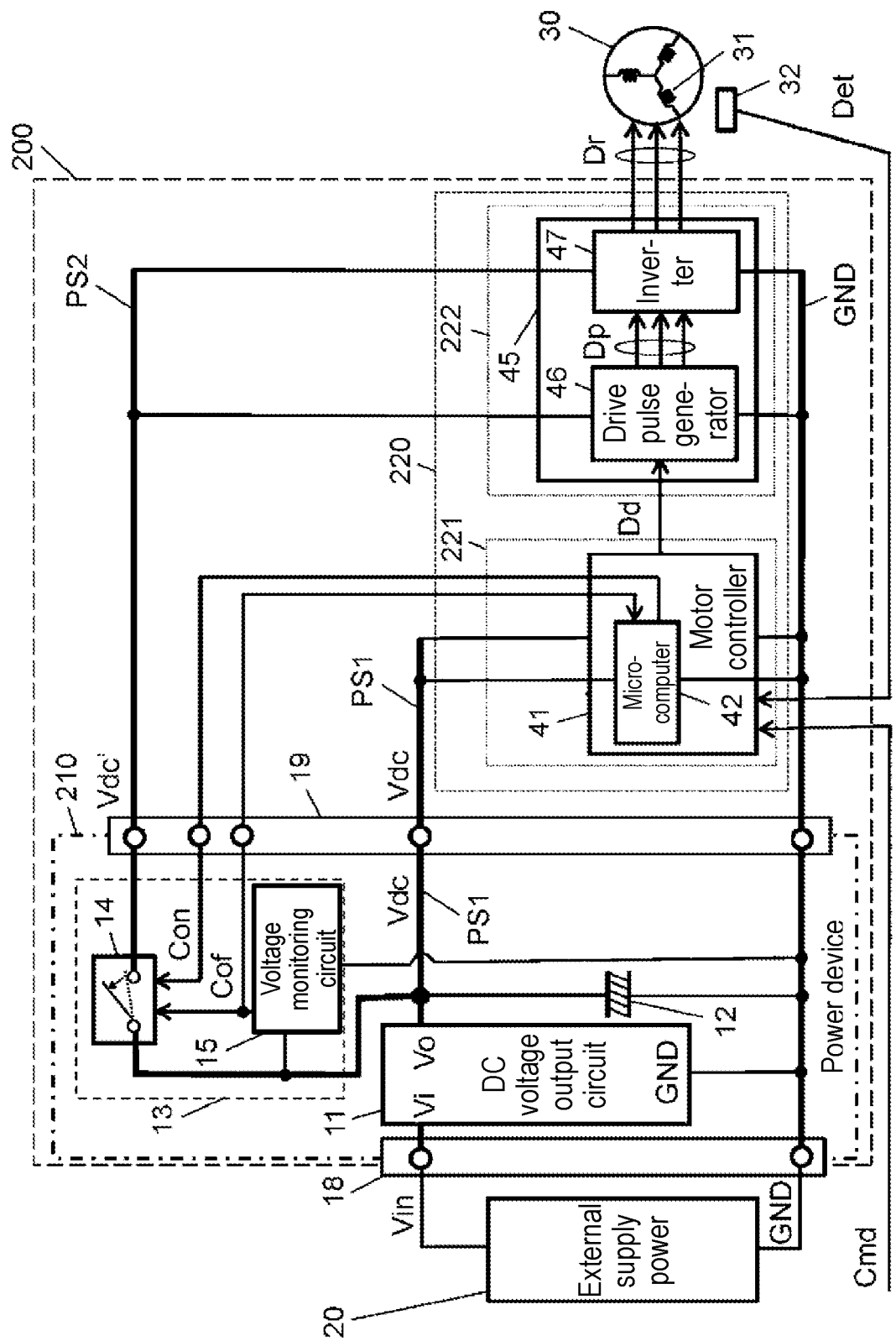
FIG. 3 is a block diagram showing a motor control apparatus according to a second exemplary embodiment of the present invention.

FIG. 3 is a block diagram showing motor control apparatus 200 according to a second exemplary embodiment of the present invention. As shown in FIG. 3, motor control apparatus 200 also includes power device 210 almost the same as that of the first exemplary embodiment, so that power is supplied from power device 210 to load 220. Power device 210 receives power of DC input voltage Vin from external supply power 20 via power input terminal 18. Load 220 is electrically connected to power device 210. Load 220 includes motor controller 41 and motor drive unit 45. Further, motor controller 41 and motor drive unit 45 function as a drive controller, and are formed by electrical circuits that drive and control motor 30. Power device 210 supplies, to load 220, power of a predetermined voltage necessary for operating these electrical circuits.

Also in the present exemplary embodiment, internal power voltage Vdc of DC voltage VC is supplied, as internal power, to each electrical circuit while motor control apparatus 200 is operating, similarly to the first exemplary embodiment. These electrical circuits drive motor 30 while controlling rotational operation of motor 30. In the present exemplary embodiment, the same components as those in the first exemplary embodiment are denoted by the same reference numerals, and the description thereof will be incorporated.

Also in the present exemplary embodiment, load 220 is divided into two described below. That is, in the present exemplary embodiment, motor controller 41 including microcomputer 42 is distinguished from others as a specified circuit, and is designated as first load 221 that is a part of load 220. Motor drive unit 45 other than motor controller 41 is designated as second load 222 that is formed by non-specified circuits.

Further, in line with the division of load 220, power output is also divided into two. That is, first power supply line PS1 is designated as a power supply line for the specified circuits, whereby motor controller 41 is connected to first power supply line PS1 for internal power voltage Vdc. Second power supply line PS2 is designated as a power supply line for the non-specified circuits, whereby motor drive unit 45 is connected to second power supply line PS2 for internal power voltage Vdc' via switch 14. As described above, power device 210 supplies internal power voltage Vdc directly to motor controller 41, and supplies internal power voltage Vdc to motor drive unit 45 via a voltage supply control circuit including switch 14.

Switch 14 is controlled by voltage monitoring circuit 15, similarly to the first exemplary embodiment, and is controlled also by microcomputer 42. With such a configuration, a voltage due to electric charges accumulated in capacitor 12 in first power supply line PS1 is distributed to motor controller 41 and motor drive unit 45 as internal power voltage Vdc, after the external power is cut off.

In the present exemplary embodiment, an output holding time of internal power voltage Vdc to motor controller 41 is firstly extended by supplying power in this way. Then, microcomputer 42 executes, by utilizing this output holding time, processing to be executed when power is stopped. Further, motor drive unit 45 is connected to capacitor 12 as soon as the processing to be executed when power is stopped is completed, so that internal power voltage Vdc is caused to drop rapidly, whereby a malfunction, etc., due to remaining power is suppressed.

Motor 30 that is connected to motor control apparatus 200, and motor controller 41 and motor drive unit 45 that control and drive motor 30 will be described.

Motor 30 driven by motor control apparatus 200 in the present exemplary embodiment is a three-phase brushless motor. Motor 30 includes a stator (not shown) in which winding 31 is wound around a stator core, and a rotor (not shown) that rotates around a shaft by energizing winding 31. In the present exemplary embodiment, motor 30 has three-phase winding 31 including a U-phase winding, a V-phase winding, and a W-phase winding. An example will be described, in which motor control apparatus 200 energizes winding 31 of each phase by drive signal Dr that is subjected to pulse width modulation (PWM).

As shown in FIG. 3, motor control apparatus 200 includes motor drive unit 45 and power device 210. Motor drive unit 45 includes motor controller 41 that controls the rotational operation of motor 30, drive pulse generator 46, and inverter 47, and energizes motor 30 according to a command from motor controller 41. Power device 210 supplies power to them.

Command signal Cmd, which is a signal for commanding a rotational speed or a torque amount, is input to motor control apparatus 200 as a command from, for example, an external host controller (not shown). Additionally, in line with a control method, motor 30 is provided with detector 32 that detects a rotational speed, a torque amount, or the like. Detection signal Det is sent from detector 32. Motor control apparatus 200 generates drive signals Dr for the three phases based on feedback control in which the rotation of motor 30 has a rotational speed and a torque according to command signal Cmd. Motor control apparatus 200 applies each generated drive signal Dr to each winding 31 to control the rotation of motor 30.

In motor control apparatus 200, motor controller 41 includes microcomputer 42 that executes processing based on a program. That is, motor controller 41 has a function of executing each processing in accordance with software indicating a processing procedure, such as a program. Specific processing to be executed by motor controller 41 includes rotation control processing based on the feedback control, or as described above, the processing to be executed by microcomputer 42 when power is stopped after the external power is cut off.

Next, the rotation control processing for motor 30 by motor controller 41 and motor drive unit 45 will be described by taking speed control as an example.

When controlling a speed of motor 30 such that the speed becomes a predetermined rotational speed, motor controller 41 first executes, based on the feedback control, rotation control processing as described below. That is, motor controller 41 calculates a deviation, which is a difference between command signal Cmd indicating a speed command and detection signal Det indicating an actual rotational speed, by arithmetic processing by microcomputer 42. Next, motor controller 41 executes arithmetic processing such as proportional-integral-differential (PID) processing on the calculated deviation. Then, motor controller 41 generates a drive waveform signal according to a result of this arithmetic processing, and outputs it as rotation control signal Dd to drive pulse generator 46.

Drive pulse generator 46 having a pulse width modulation (PWM) circuit generates, for each phase, PWM signal Dp that is a pulse signal having a pulse width or a duty ratio corresponding to a level of rotation control signal Dd, and outputs it to inverter 47. Inverter 47 includes a power switching element, a diode, etc. Inverter 47 switches internal power voltage Vdc' supplied from power device 210 in accordance with pulse signal Dp by using such a switching element, thereby generating drive signal Dr for driving winding 31.

By such operation of motor controller 41 and motor drive unit 45, the feedback control is executed such that the rotation of the rotor follows command signal Cmd.

As described above, in the present exemplary embodiment, load 220 including motor controller 41 and motor drive unit 45 is connected to power device 210.

Here, when power consumption of motor controller 41 that is first load 221 is compared with that of motor drive unit 45 that is second load 222, the power consumption of motor drive unit 45 is much higher than that of motor controller 41 because motor drive unit 45 is a power unit that powers winding 31. In the present exemplary embodiment, paying attention to such a difference, motor controller 41, which consumes less power and on which control processing can be performed, is distinguished from others as first load 221, and is specified as a circuit, the operation of which is to be continued even after the external power is cut off. As described above, motor drive unit 45, which consumes a large amount of power and the operation of which does not need to be continued after the power is cut off, is designated as second load 222 that does not need to operate after the supply of power is cut off.

Further, with motor control apparatus 200 that controls movement, such as rotation, of the motor as in the present exemplary embodiment, it is preferable that when a failure, such as a momentary interruption, occurs, the movement of the motor is immediately stopped in terms of safety. In the present exemplary embodiment, motor drive unit 45 is also designated as second load 222 from such a viewpoint. Thereby, after the supply of external power is cut off, the supply of power to motor drive unit 45 is immediately stopped by voltage supply control circuit 13. Therefore, a drive current does not flow through winding 31, and as a result, the movement of motor 30 is stopped sooner.

The present exemplary embodiment is characterized in that in order to further enhance the safety as a motor control apparatus against a failure such as a momentary interruption, microcomputer 42 in motor controller 41 also executes processing to be executed when power is stopped in power device 210.

Next, the processing to be executed by microcomputer 42 when the supply of power to voltage supply control circuit 13 is stopped will be described.

In voltage supply control circuit 13, one side of switch 14 is connected to power supply line PS1 and the other side is connected to power supply line PS2, as shown in FIG. 3, similarly to the first exemplary embodiment. In the present exemplary embodiment, opening and closing of switch 14 is controlled also by switch control signal Con from microcomputer 42 included in motor controller 41, in addition to switch control signal Cof from voltage monitoring circuit 15. Further, voltage monitoring circuit 15 sends switch control signal Cof to microcomputer 42.

In voltage supply control circuit 13, voltage monitoring circuit 15 monitors the voltage level of internal power voltage Vdc in power supply line PS1, as described in the first exemplary embodiment. When detecting that internal power voltage Vdc has dropped to a voltage level lower than that of determination voltage Vcof, voltage monitoring circuit 15 determines that the supply of external power from external supply power 20 has been cut off. Based on this determination, voltage monitoring circuit 15 outputs switch control signal Cof for controlling switch 14 so as to be opened. When it is determined, with voltage supply control circuit 13 operating in this way, that the supply of external power has been cut off, power device 210 continues, for a while, the supply of internal power voltage Vdc via first power supply line PS1, and stops the supply of internal power voltage Vdc via second power supply line PS2.

That is, after the external power is cut off, the supply of power to motor drive unit 45, which consumes a large amount of power, via second power supply line PS2 is immediately stopped. Therefore, even after the external power is cut off, the supply of internal power voltage Vdc to motor controller 41 via first power supply line PS1 can be continued for a while, so that microcomputer 42 can be kept operating during that time.

In the present exemplary embodiment, switch 14 is further controlled by the operation of microcomputer 42 utilizing this period. Microcomputer 42 first recognizes that the supply of external power from external supply power 20 has been cut off by switch control signal Cof from voltage monitoring circuit 15. When recognizing this cut-off of external power, microcomputer 42 starts to execute the processing to be executed when power is stopped. Microcomputer 42 outputs, to switch 14, switch control signal Con for controlling switch 14 so as to be closed, at an end of the processing to be executed when power is stopped. Thereby, switch 14, once opened after the external power is cut off, is closed, so that capacitor 12 is discharged at once by motor drive unit 45 reconnected.

In the present exemplary embodiment, it is configured, by controlling the opening and closing of switch 14 as described above, that the supply of internal power via second power supply line PS2 is once stopped after the external power is cut off, and further the supply of internal power can be resumed after a predetermined period has passed since the stop, as described above. Thereby, capacitor 12 is finally completely discharged, thereby suppressing a malfunction, etc., due to remaining power.

Figure 4:
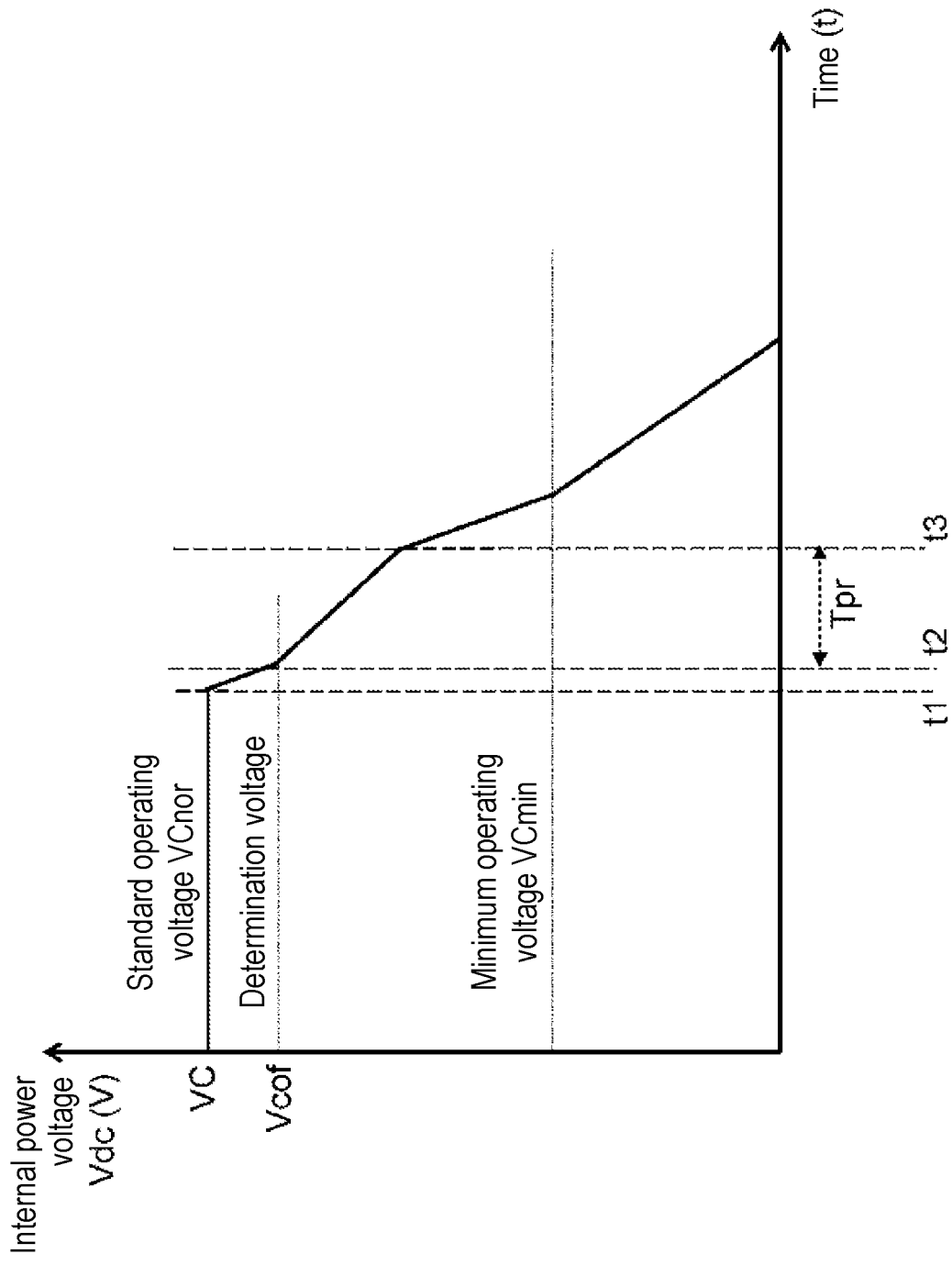
FIG. 4 is a graph showing voltage levels of an internal power voltage before and after cut-off of supply of external power in the motor control apparatus.

FIG. 4 is a graph showing, in the motor control apparatus according to the second exemplary embodiment of the present invention, voltage levels of internal power voltage Vdc before and after cut-off of the supply of external power. In FIG. 4, a time when the supply of external power is cut off is designated as time t1, a time when switch control signal Cof is sent is designated as time t2, and a time when switch control signal Con is sent is designated as time t3.

In FIG. 4, the external power connected to power input terminal 18 is cut off at time t1. Then, a voltage across both ends of capacitor 12 drops due to discharge, and at time t2, voltage monitoring circuit 15 detects the cut-off of external power and sends switch control signal Cof. Switch 14 is opened by switch control signal Cof, so that the supply of internal power voltage Vdc to motor drive unit 45 via second power supply line PS2 is cut off. Thereby, the supply of internal power voltage Vdc from capacitor 12 to motor controller 41 is extended, and microcomputer 42 continues executing the processing to be executed when power is stopped, by utilizing holding time Tpr after time t2. Microcomputer 42 outputs, to switch 14, switch control signal Con for controlling switch 14 so as to be closed, at time t3. Thereby, switch 14 returns to a closed state and motor drive unit 45 is connected to first power supply line PS1, so that a rate at which capacitor 12 is discharged is increased, and as shown in FIG. 4, internal power voltage Vdc also approaches 0 V rapidly.

As described above, motor control apparatus 200 of the present exemplary embodiment includes power device 210 similar to that of the first exemplary embodiment, motor controller 41, and motor drive unit 45. Motor controller 41 includes microcomputer 42 and controls the rotation of motor 30. Motor drive unit 45 energizes motor 30 according to a command from motor controller 41. In the present exemplary embodiment, motor controller 41 is specified as first load 221 that is a part of load 220, and power device 210 supplies, directly to motor controller 41, internal power voltage Vdc via first power supply line PS1. On the other hand, power device 210 supplies, to motor drive unit 45 as second load 222 that is the other part of load 220, internal power voltage Vdc via voltage supply control circuit 13.

As described above, motor control apparatus 200 of the present exemplary embodiment is motor control apparatus 200 that drives and controls motor 30, and includes: power device 210 similar to that of the first exemplary embodiment; motor controller 41, as the first load, that controls the rotation of motor 30; and motor drive unit 45, as the second load, that energizes motor 30 according to a command from motor controller 41.

With such a configuration, motor control apparatus 200 of the present exemplary embodiment extends the power supply time of power to motor controller 41 that is specified as needing its operation for a while even after the supply of power is cut off, without increasing the number of capacitors, etc. In particular, the supply of internal power voltage Vdc to motor drive unit 45, which is a power unit, is immediately stopped after the supply of power is cut off, and hence the power supply time of the power to motor controller 41 can be further extended. Further, the supply of internal power voltage Vdc to motor drive unit 45 is immediately stopped, and hence the movements, such as rotation, of motor 30 can be stopped soon, so that the safety at the time of momentary interruption can also be improved.

Furthermore, in motor control apparatus 200 of the present exemplary embodiment, microcomputer 42 of motor controller 41 is specified as first load 221 that is a part of load 220, and it is configured such that power device 210 supplies internal power voltage Vdc directly to microcomputer 42 via first power supply line PS1. Therefore, microcomputer 42 can continue its operation for a while after the supply of power is cut off, so that the processing, etc., which is to be executed by microcomputer 42 when the power is stopped, can be stably executed during that time. Microcomputer 42 controls switch 14 so as to return to a closed state as soon as the processing to be executed when power is stopped is completed, so that capacitor 12 is connected to motor drive unit 45. Therefore, internal power voltage Vdc drops rapidly after that. Thereby, a malfunction, etc., due to remaining power can be suppressed.

As described above, motor control apparatus 200 of the present exemplary embodiment may include microcomputer 42. Power device 210 may supply internal power voltage Vdc to microcomputer 42, and microcomputer 42 may control voltage supply control circuit 13 so as to resume the supply of internal power voltage Vdc after a predetermined period has passed since the cut-off of the supply of internal power voltage Vdc by voltage supply control circuit 13.

Figure 5:
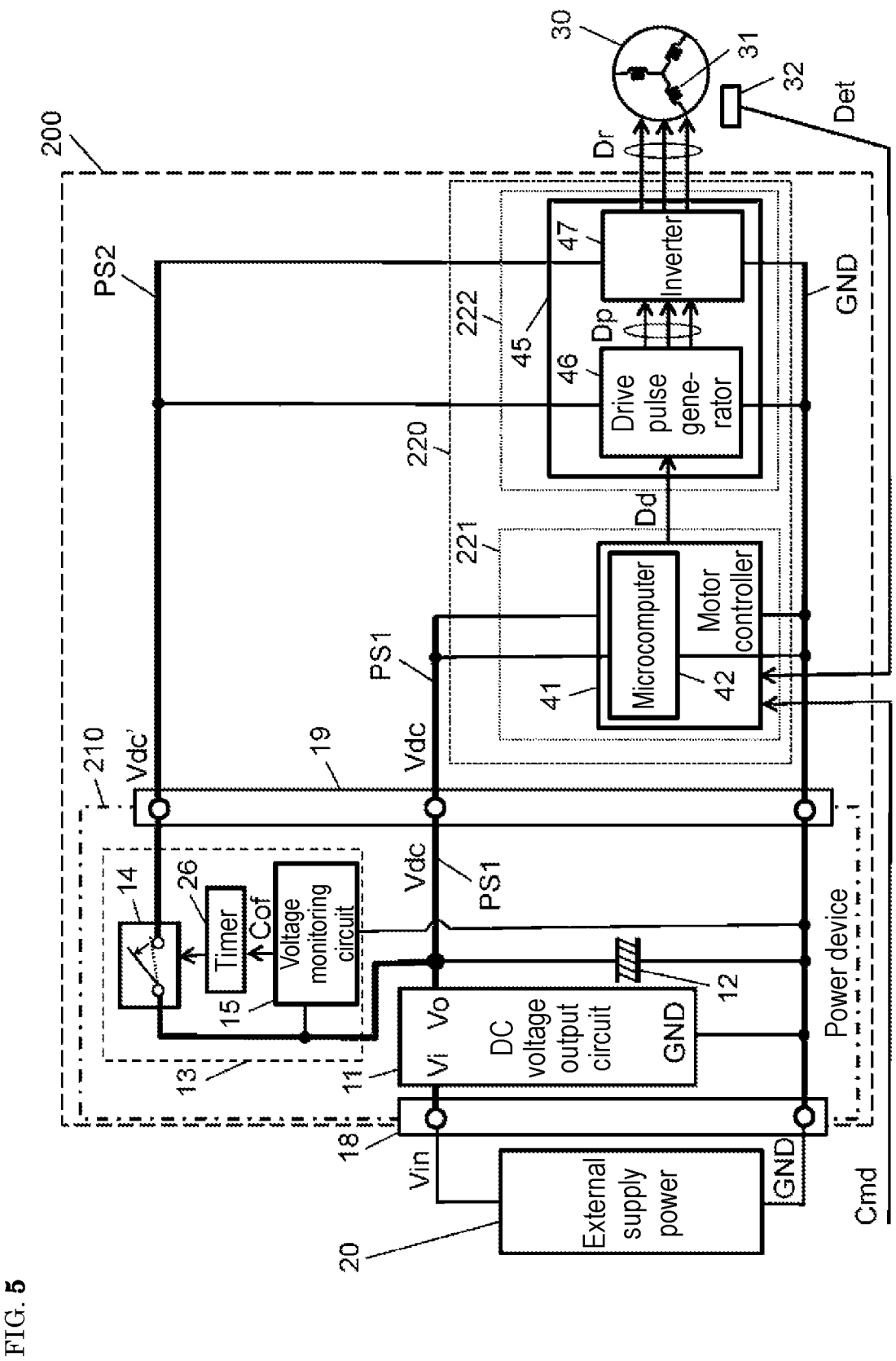
FIG. 5 is a block diagram showing another configuration example of the motor control apparatus.

In the above description, a configuration example has been described, in which voltage monitoring circuit 15 controls switch 14 so as to be opened and microcomputer 42 controls switch 14 so as to be closed. However, a configuration may be adopted, in which the opening and closing of switch 14 is controlled only by voltage monitoring circuit 15. That is, after detecting the cut-off of power, voltage monitoring circuit 15 sends a switch control signal for controlling switch 14 so as to be opened only for a predetermined period such as holding time Tpr in FIG. 4, so that the supply of internal power voltage Vdc to motor drive unit 45 is cut off only for the predetermined period. A configuration may be adopted, in which microcomputer 42 executes, during the predetermined period, the processing to be executed when power is stopped. FIG. 5 is a block diagram showing another configuration example of motor control apparatus 200 according to the second exemplary embodiment of the present invention. Power device 210 includes timer 26 that holds switch control signal Cof output from voltage monitoring circuit 15 for a predetermined period. By supplying an output of timer 26 to switch 14, the supply of internal power voltage Vdc can be cut off only for a period when timer 26 is operating, as described above. Therefore, even with such a configuration, the same effects as the configuration in which microcomputer 42 sends switch control signal Con can be obtained.

Alternatively, in power device 210, voltage supply control circuit 13 may cut off the supply of internal power voltage Vdc for a predetermined period, when detecting a drop in internal power voltage Vdc.

Third Exemplary Embodiment

Figure 6:
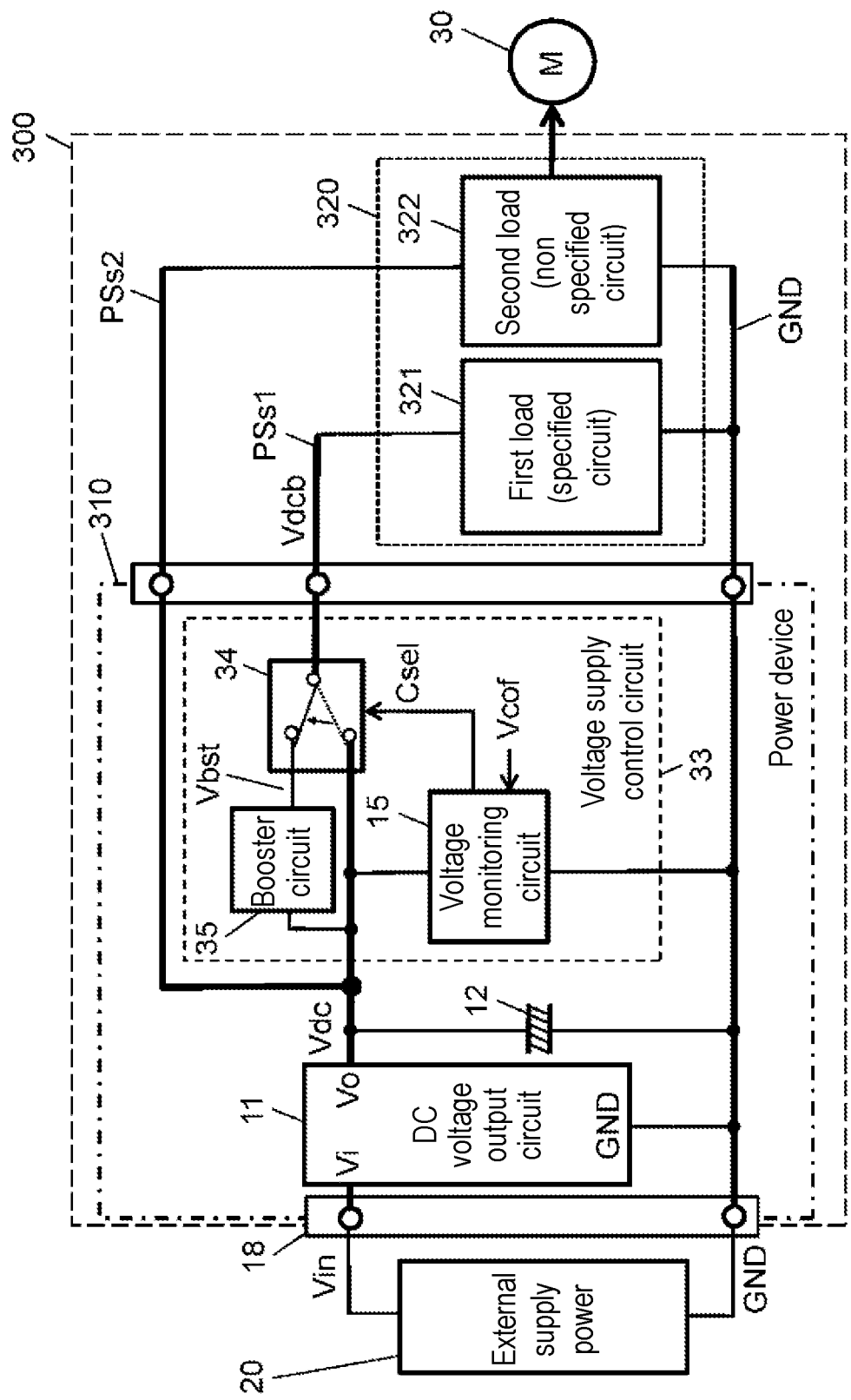
FIG. 6 is a block diagram showing electrical equipment including a power device according to a third exemplary embodiment of the present invention.

FIG. 6 is a block diagram showing electrical equipment including power device 310 according to a third exemplary embodiment of the present invention. Also in the present exemplary embodiment, motor control apparatus 300 that drives and controls motor 30 will be described as an example of the electrical equipment.

As shown in FIG. 6, motor control apparatus 300 includes power device 310. Power is supplied from power device 310 to load 320. Power device 310 receives power of DC input voltage Vin from external supply pow 20 via power input terminal 18, similarly to the first exemplary embodiment. Load 320 is electrically connected to power device 310. Power of a predetermined voltage necessary for operating load 320 is supplied from power device 310 to load 320.

Also in the present exemplary embodiment, internal power voltage Vdc of DC voltage VC is supplied, as internal power, to respective electrical circuits serving as load 320, while motor control apparatus 300 is operating. Additionally, load 320 is also divided into first load 321 and second load 322. That is, first load 321 is formed by specified circuits, and the internal power is supplied via first power supply line PSs1. Second load 322 is formed by circuits other than them, and the internal power is supplied via second power supply line PSs2. The electric circuits serving as load 320 drive motor 30 while controlling the rotational operation of motor 30.

In the present exemplary embodiment, a configuration is adopted, in which voltage supply control circuit 33 having booster circuit 35, instead of voltage supply control circuit 13 in comparison with the first exemplary embodiment, is included. The present exemplary embodiment is different from the first exemplary embodiment in a way of supplying internal power to first load 321 and second load 322. In the present exemplary embodiment, by adopting such a configuration, a voltage, obtained by boosting internal power voltage Vdc due to electric charges accumulated in capacitor 12, is used as the internal power, the supply of which is continued for a while after external power is cut off, thereby extending a period when first load 321 can operate. The details will be described below. In the present exemplary embodiment, the same components as those in the first exemplary embodiment are denoted by the same reference numerals, and the description thereof will be incorporated.

Next, the configuration of power device 310 will be described focusing on voltage supply control circuit 33. Power device 310 includes: DC voltage output circuit 11 and capacitor 12 that generate internal power voltage Vdc of DC voltage VC; and voltage supply control circuit 33 for extending the period when first load 321 can operate.

Voltage supply control circuit 33 is provided with booster circuit 35 in order to boost internal power voltage Vdc to boosted voltage Vbst that is a higher voltage. Voltage supply control circuit 33 further includes: voltage monitoring circuit 15 that monitors internal power voltage Vdc and, when power is cut off, it outputs switch switching signal Csel; and selection switch 34 that switches paths, through which the power is supplied to first power supply line PSs1, by switch switching signal Csel.

Voltage monitoring circuit 15 monitors a voltage level of output voltage Vo of DC voltage output circuit 11, that is, a voltage level of internal power voltage Vdc, similar to the first exemplary embodiment. Voltage monitoring circuit 15 determines a supply state of the external power depending on whether internal power voltage Vdc is at a voltage level lower than that of determination voltage Vcof, and outputs, to selection switch 34, switch switching signal Csel indicating a result of this determination.

One side of selection switch 34 (hereinafter, simply referred to as switch 34 as appropriate) has two terminals that can be selected. A first terminal of the two is connected to an output of DC voltage output circuit 11 that serves as internal power voltage Vdc, and a second terminal of the two is connected to an output of booster circuit 35 that serves as boosted voltage Vbst obtained by boosting internal power voltage Vdc. The other side of switch 34 is connected to first power supply line PSs1. That is, with such a configuration, an internal voltage selected to be either internal power voltage Vdc or boosted voltage Vbst is supplied to first power supply line PSs1 according to a command of switch switching signal Csel. In FIG. 6, the internal voltage in first power supply line PSs1 is shown as internal power voltage Vdcb for first load 321.

Regarding internal power voltage Vdcb, specifically, when switch switching signal Csel indicates that internal power voltage Vdc is at a voltage level higher than or equal to that of determination voltage Vcof, switch 34 selects internal power voltage Vdc, so that internal power voltage Vdc is supplied to first power supply line PSs1 and internal power voltage Vdcb for first load 321 becomes internal power voltage Vdc. Conversely, when switch switching signal Csel indicates that internal power voltage Vdc is at a voltage level lower than that of determination voltage Vcof, switch 34 selects boosted voltage Vbst, so that boosted voltage Vbst is supplied to first power supply line PSs1 and internal power voltage Vdcb for first load 321 becomes boosted voltage Vbst. Internal power voltage Vdcb is supplied to first load 321.

For second load 322, a configuration example is given, in which internal power voltage Vdc is directly supplied via second power supply line PSs2. Instead of this configuration, another configuration may be adopted, in which internal power voltage Vdc' is supplied to second load 322 via opening and closing switch 14 controlled by voltage monitoring circuit 15, like second power supply line PS2 of the first exemplary embodiment.

As described above, power device 110 of the first exemplary embodiment may further include booster circuit 35 that generates boosted voltage Vbst obtained by boosting internal power voltage Vdc, like power device 31 of the third exemplary embodiment. When detecting a drop in internal power voltage Vdc, voltage supply control circuit 13 may cut off the supply of internal power voltage Vdc' to second load 122, and may supply, to first load 121, the internal power by switching from the supply of internal power voltage Vdc to the supply of boosted voltage Vbst.

Among electrical components included in load 320, there may be some devices, the operating threshold voltage of each of which is high and a voltage drop is not allowed. Since internal power voltage Vdc drops in proportion to time only with output voltage Vo of DC voltage output circuit 11, a device having a higher threshold voltage stops its operation sooner. However, by keeping boosted voltage Vbst due to booster circuit 35 constant, an operation time of such a device having a high threshold voltage can be extended. That is, by specifying first load 321 as a device having a high threshold voltage, a period when it can operate can be extended. Further, by forming first load 321 by a microcomputer, etc., the operation of the equipment can be protected even after the power is cut off, by the control by the microcomputer, etc., utilizing the period when it can operate.

Next, operation of motor control apparatus 300 including power device 310 configured as described above will be described focusing on operation when the external power is cut off.

Figure 7:
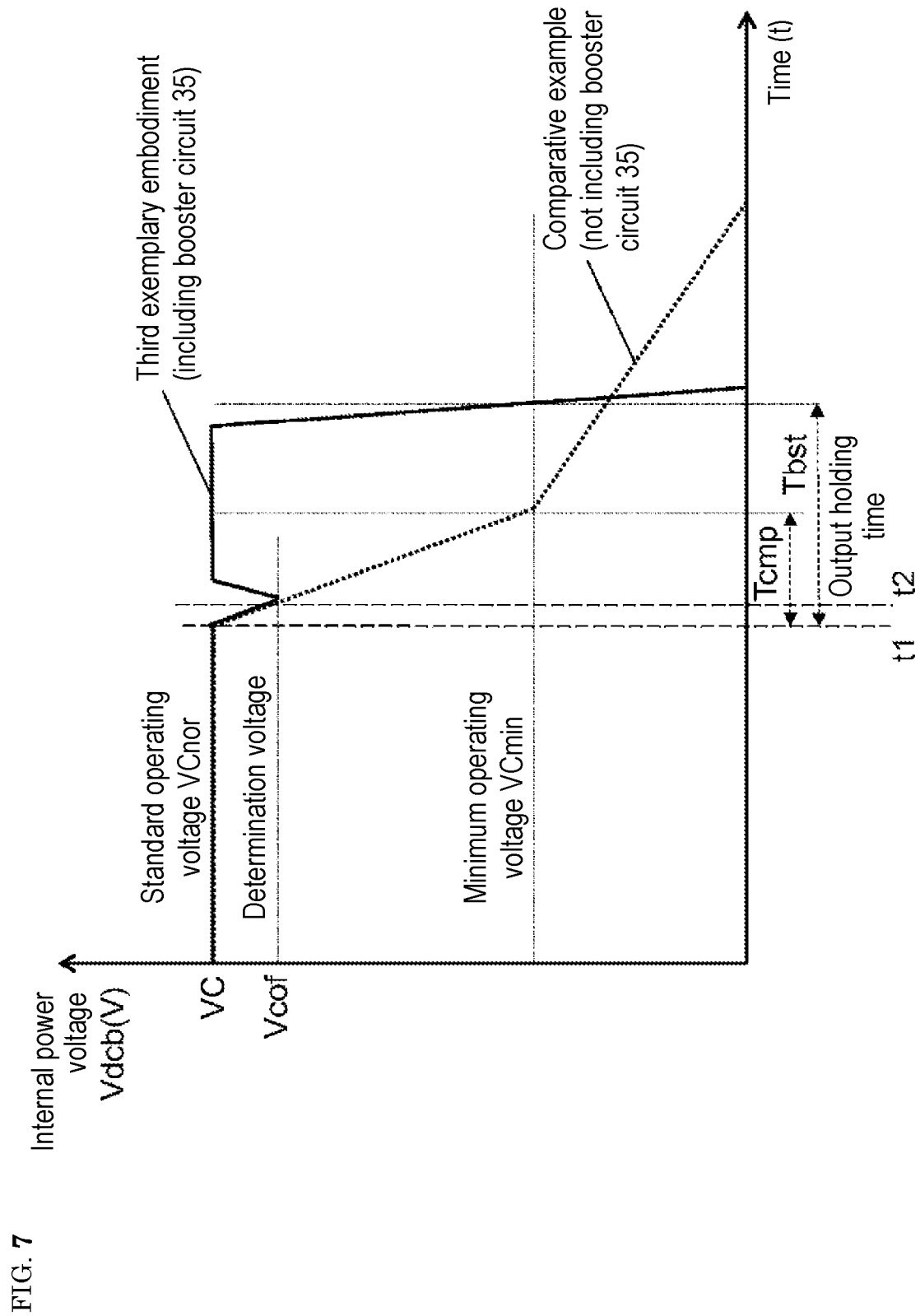
FIG. 7 is a graph showing voltage levels of an internal power voltage to a first load before and after cut-off of supply of external power in the electrical equipment.
Figure 8:
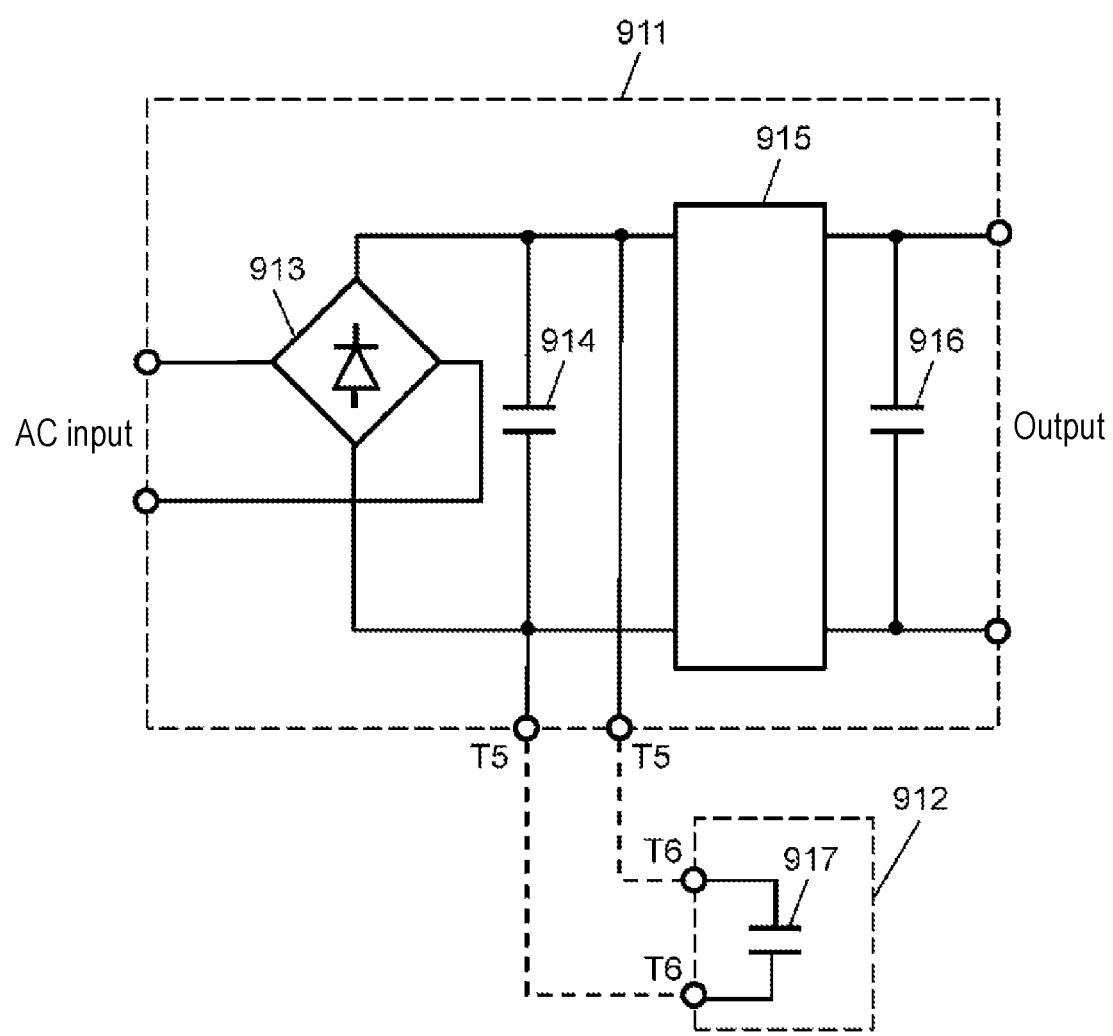
FIG. 8 is a block diagram showing a power device of a conventional example.
Figure 9:
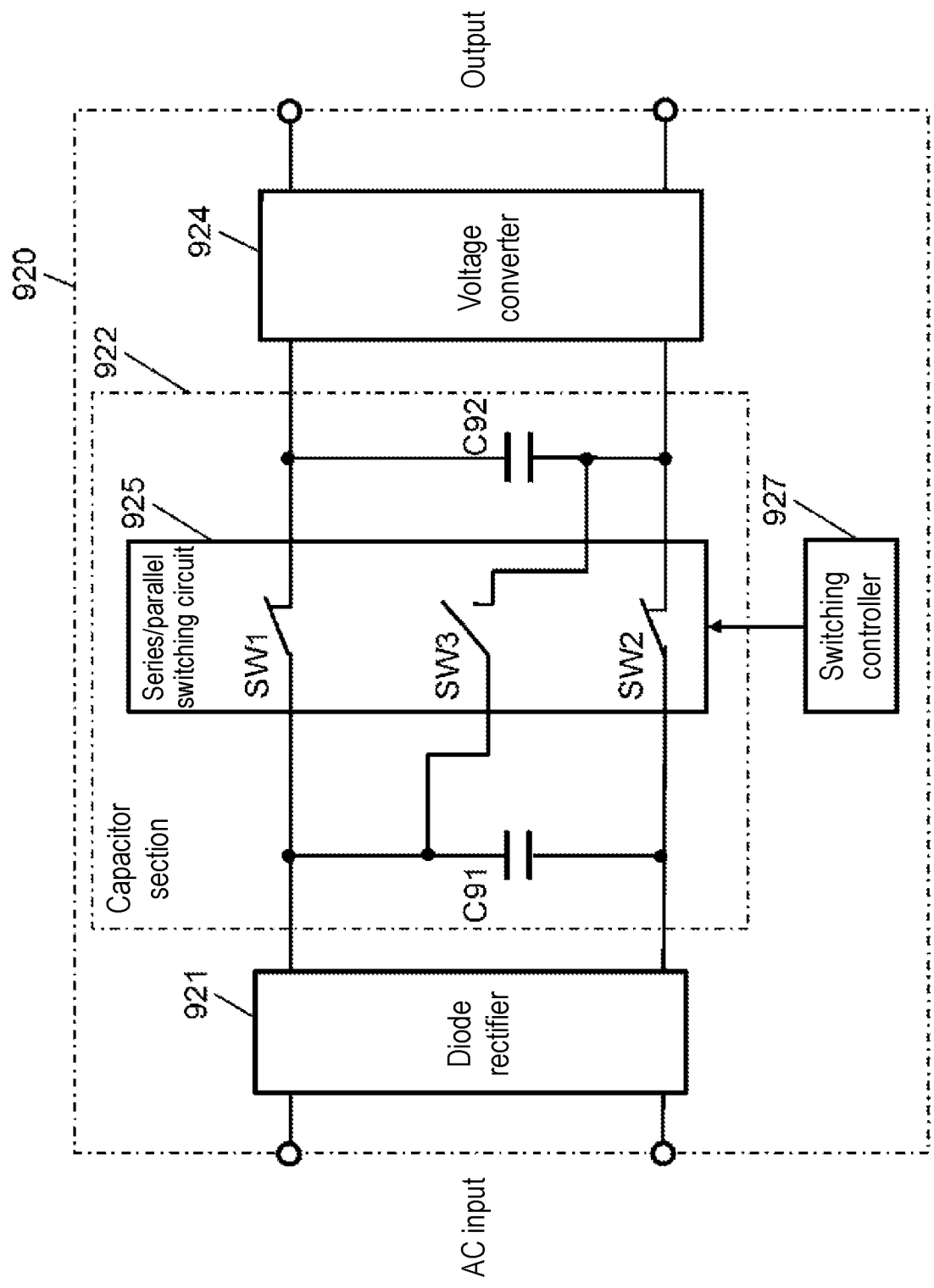
FIG. 9 is a block diagram showing another power device of the conventional example.

FIG. 7 is a graph showing, in electrical equipment including the power device according to the third exemplary embodiment of the present invention, voltage levels of internal power voltage Vdcb to first load 321 before and after cut-off of the supply of the external power. In FIG. 7, a change in a voltage level in the present exemplary embodiment is shown by a solid line, and as a comparative example, a change in a voltage level when voltage supply control circuit 33 is not provided is shown by a dotted line. In FIG. 7, a time when the supply of the external power is cut off is designated as time t1. Further, the voltage level of determination voltage Vcof is set to be within a range of minimum operating voltage VCmin or higher to standard operating voltage VCnor or lower, similarly to the first exemplary embodiment.

First, internal power voltage Vdcb, which is DC voltage VC, is supplied to load 320 while the supply of the external power is being continued, as shown in FIG. 7.

Thereafter, when the external power connected to power input terminal 18 is cut off at time t1, a voltage across both ends of capacitor 12 drops as it is discharged by load 320 connected. Voltage monitoring circuit 15 detects, at time t2, the cut-off of the external power when the dropping voltage becomes lower than or equal to determination voltage Vcof, and sends switch switching signal Csel. Switch 34 is operated by switch switching signal Csel, the path, through which the internal voltage is supplied, is switched from the output of DC voltage output circuit 11 to the output of booster circuit 35. With this, the voltage to be supplied to first load 321 is boosted, by booster circuit 35, to DC voltage VC that is equal to one when the power is supplied, only for output holding time Tbst, as seen after time t2 in FIG. 7. Thereafter, the voltage across both ends of capacitor 12 drops with time and, when it is lower than or equal to an operating voltage of booster circuit 35, the voltage supply to first load 321 is stopped.

In the present exemplary embodiment, the output holding time can be extended by extending, by booster circuit 35, the time until when the voltage to be supplied to first load 321 starts to drop, as shown in FIG. 7.

As described above, power device 310 according to the present exemplary embodiment is power device 310 that supplies internal power to load 320, and includes: DC voltage output circuit 11 that generates DC internal power voltage Vdc from external supply power 20; capacitor 12 that is connected to internal power voltage Vdc; booster circuit 35 that generates a boosted voltage by boosting internal power voltage Vdc; and voltage supply control circuit 33 that monitors a voltage level of internal power voltage Vdc and that, when detecting a drop in internal power voltage Vdc, supplies the internal power by switching supply of internal power voltage Vdc to supply of the boosted voltage. The internal power is supplied to a part of load 320 via voltage supply control circuit 33.

In the present exemplary embodiment, by adopting the configuration described above, a power supply time of power to first load 321, which needs to operate for a while even after the supply of power is cut off, is extended without increasing the number and capacity of capacitors. Further, operation of the motor control apparatus, etc., can be protected, for example, when the apparatus is momentarily interrupted, by utilizing the extended power supply time.

INDUSTRIAL APPLICABILITY

As described above, the power device according to the present invention can extend the output holding time of internal power without increasing the number or capacity of capacitors for holding voltage. Therefore, the power device according to the present invention is useful as a power device to be used in, for example, the motor control apparatus of the present invention or general electrical equipment.

The invention claimed is:

1. A power device that supplies internal power to a load, the power device comprising:
a DC voltage output circuit that generates a DC internal power voltage from an external supply power;
a capacitor that is connected to the DC internal power voltage; and
a voltage supply control circuit that monitors a voltage level of the DC internal power voltage and that, when detecting a drop in the DC internal power voltage, cuts off supply of the internal power voltage, wherein
the voltage supply control circuit includes a voltage monitoring circuit that monitors the DC internal power voltage and an opening and closing switch controlled by the voltage monitoring circuit,
the power device is configured to supply, to a first load that is a part of the load, the DC internal power voltage, and is configured to supply, to a second load that is a load other than the first load, the DC internal power voltage via the opening and closing switch, and
the voltage monitoring circuit is configured to open the opening and closing switch when the DC internal power voltage is at a voltage lower than a predetermined reference voltage.

2. The power device according to claim 1, wherein when detecting a drop in the DC internal power voltage, the voltage supply control circuit cuts off the supply of the DC internal power voltage for a predetermined period.

3. A motor control apparatus that drives and controls a motor, the motor control apparatus comprising:
the power device according to claim 1;
as the first load, a motor controller that controls rotation of the motor; and
as the second load, a motor drive unit that energizes the motor according to a command from the motor controller.

4. The motor control apparatus according to claim 3, wherein
the motor controller has a microcontroller,
the power device supplies the DC internal power voltage to the microcontroller, and
the microcontroller controls the voltage supply control circuit so as to resume the supply of the DC internal power voltage after a predetermined time has passed since cut-off of the supply of the DC internal power voltage by the voltage supply control circuit.

5. The power device according to claim 1, wherein the second load is a load that does not need to operate after the supply is cut off, and the first load is a circuit that needs to operate for a while after the supply of power is cut off.

6. A power device that supplies internal power to a load, the power device comprising:
a DC voltage output circuit that generates a DC internal power voltage from an external power supply;
a capacitor that is connected to the DC internal power voltage;
a voltage supply control circuit that monitors a voltage level of the DC internal power voltage and, when detecting a drop in the DC internal power voltage, cuts off supply of the internal power voltage; and
a booster circuit that generates a boosted voltage by boosting the DC internal power voltage, wherein
the voltage supply control circuit includes a selection switch that selects one of the DC internal power voltage and the boosted voltage and supplies the selected voltage to a first load that is a part of the load, a first terminal of the selection switch being connected to an output of the DC internal power voltage and a second terminal of the selection switch being connected to an output of the booster circuit, and
the voltage supply control circuit is configured to cut off the supply of the DC internal power voltage to a second load that is a load other than the first load, when it detects a drop in the DC internal power voltage, and is configured to supply, to the first load, by controlling the selection switch, by switching from the supply of the DC internal power voltage to the supply of the boosted voltage.

7. A power device that supplies internal power to a load, the power device comprising:
a DC voltage output circuit that generates a DC internal power voltage from an external supply power;
a capacitor that is connected to the DC internal power voltage;
a booster circuit that generates a boosted voltage by boosting the DC internal power voltage; and
a selection switch that selects and outputs one of the internal power voltage and the boosted voltage, a first terminal of the selection switch being connected to an output of the DC internal power voltage and a second terminal of the selection switch being connected to an output of the booster circuit, and
a voltage supply control circuit that monitors a voltage level of the DC internal power voltage and that, when detecting a drop in the DC internal power voltage, supplies the internal power by switching from supply of the DC internal power voltage to supply of the boosted voltage by controlling the selection switch, wherein
the power device is configured to supply, to a part of the load, the internal power via the voltage supply control circuit.

* * * * *